Figure 1:
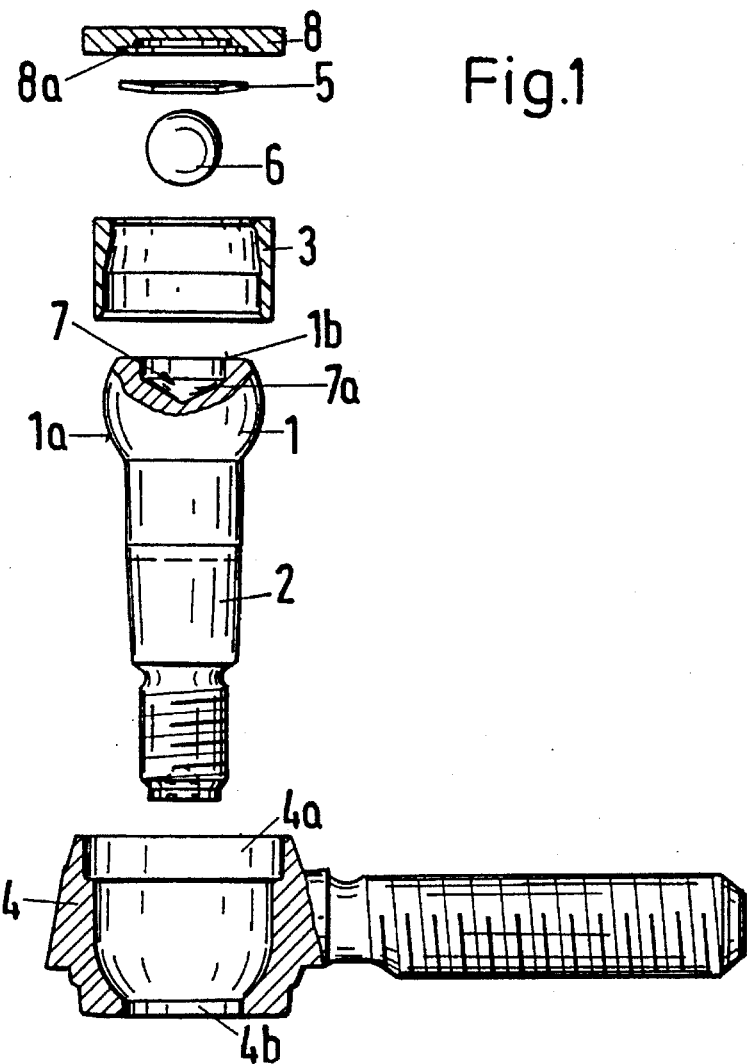

United States Patent
Broszat

[11] Patent Number: 5,464,296
[45] Date of Patent: Nov. 7, 1995

[54] PIVOT JOINT

[75] Inventor: Lothar Broszat, Monheim, Germany

[73] Assignee: TRW Fahrwerkesysteme GmbH & Co. KG, Dusseldorf, Germany

[21] Appl. No.: 197,923

[22] Filed: Feb. 17, 1994

[30] Foreign Application Priority Data

Feb. 20, 1993 [DE] Germany .............. 43 05 341.6

[51] Int. Cl.$^6$ .................................. F16C 11/06
[52] U.S. Cl. ................................ 403/138; 403/120
[58] Field of Search ................... 403/164, 165, 403/152, 154, 133, 120, 135, 132, 138

[56] References Cited

U.S. PATENT DOCUMENTS

| | | |
|---|---|---|
| 2,274,420 | 2/1942 | Katcher . |
| 2,755,116 | 7/1956 | Alldredge .................. 403/138 |
| 3,090,642 | 5/1963 | Gottschald et al. . |
| 3,343,856 | 9/1967 | Cislo . |
| 4,576,499 | 3/1986 | Smith .................. 403/138 X |
| 4,954,006 | 9/1990 | Suzuki et al. . |
| 5,067,841 | 11/1991 | Fukukawa et al. .................. 403/138 X |

FOREIGN PATENT DOCUMENTS

| | | | |
|---|---|---|---|
| 167886 | 6/1954 | Australia ................ 403/132 |
| 1098382 | 7/1961 | Germany . |
| 1260236 | 2/1968 | Germany . |
| 3905474 | 4/1990 | Germany . |
| 796706 | 6/1958 | United Kingdom . |
| 1125420 | 8/1968 | United Kingdom .................. 403/138 |
| 1372974 | 11/1974 | United Kingdom .................. 403/138 |

Primary Examiner—Anthony Knight
Attorney, Agent, or Firm—Tarolli, Sundheim & Covell

[57] ABSTRACT

The invention pertains to a pivot joint with a housing (4) in which a ball pivot (1) is mounted via its ball race-shaped bearing surface (1a) by means of an inset bearing shell (3) to be free from play within a delimited range and, set against a restoring force, to be twistable and horizontally sweepable. In order to create the pivot joint, in which the defined restoring force of the spring (5), independent of respective tolerances, increases with deflection according to the spring characteristic and form, the ball pivot (1) is provided with an end surface (1b) located opposite pivot shank (2), and a conical countersink (7) extending to the edge is configured in this end surface (1b), in which the ball sits closely on the conical surface (7a) of this conical countersink (7), with the ball (6) being acted upon by the force of a spring (5) supported by the cover (8) which seals the housing (64).

2 Claims, 2 Drawing Sheets

PIVOT JOINT

The invention pertains to a pivot joint with housing, in which a ball pivot is mounted via its ball race-shaped bearing surface by means of an inset bearing shell to be free from play within a delimited range and, set against a restoring force, to be twistable and horizontally sweepable whereby the housing is sealed by a cover.

These types of pivot joints are known from practical application. These known pivot joints include the disadvantage that they do not enable a defined return movement since the restoring force is dependent on the tolerances [sic; precision] obtained and is thus dependent on wear.

The invention underlies the purpose of creating a pivot joint of the type described in the introduction, which, along with a simultaneous decrease in production costs since higher precision is no longer necessary, ensures a restoring force which can be predetermined and which is substantially independent of wear.

The solution to this problem definition by means of the invention is characterized in that the ball pivot is provided with an end surface located opposite the pivot shank and a conical countersink extending to the edge is configured in this end surface, whereby a ball is seated closely on the conical surface of this conical countersink, the ball being acted upon by the force of a spring supported by the cover.

With the pivot joint configured as claimed in the invention, no extremely precise manufacturing tolerances are necessary to attain a determined restoring force, since a defined restoring force is attained through the combined action of the spring supported by the cover along with the ball set into the countersink of the ball pivot. This restoring force of the spring is independent of the respective tolerances, whereby a greater deflection causes the restoring force to increase corresponding to the spring characteristic and spring shape. Accordingly, a purposeful adjustment of the restoring force is possible by means of the suitable selection of the spring or spring material.

In preferred embodiment forms of the invention the spring is configured as a disk spring and arranged in the pivot joint such that the disk spring is seated with its convex side closely adjacent to the ball and supported by its rim which fits in a recess in the cover. The use of this disk spring configured to be convex in the direction of the ball pivot insures that the ball arranged in the countersink of the ball pivot always pushes back in the event of deflection of the pivot, since any movement in an axial direction acts upon the ball under the load of the disk spring.

The invention further proposes that the bearing shell, of one-piece construction, be produced from a polyamide. Polyamide, and polyamide 66 (PA66), in particular, has the advantage that this material is thermally stable up to 150° C.

Figure 2:
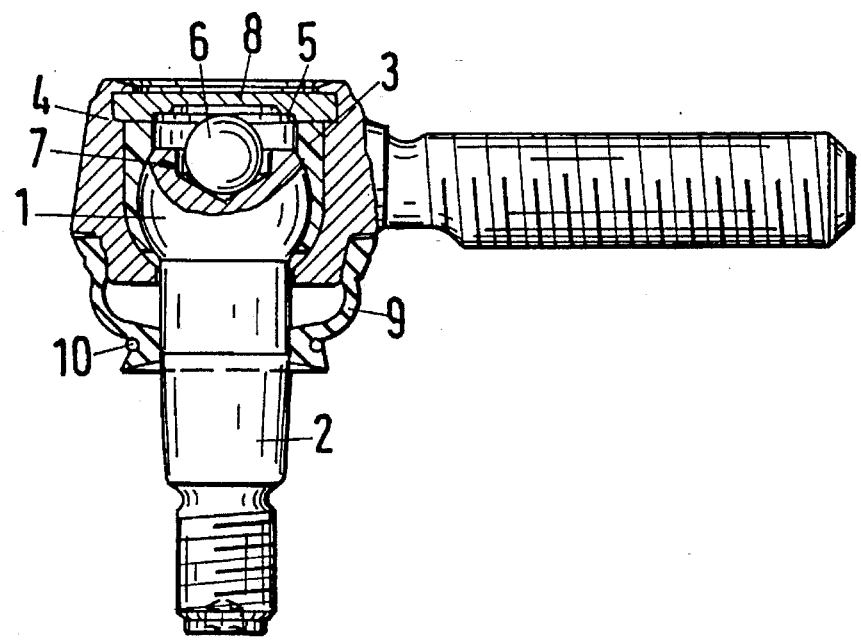

The following description of the drawings associated with and representing a preferred embodiment example of a pivot joint configured as claimed in the invention yields additional details and advantages of the object of this invention. Shown in the drawings are:

FIG. 1 a partial longitudinal section of an exploded view of a pivot joint as claimed in the invention;

FIG. 2 a partial longitudinal section of an assembled pivot joint and

Figure 3:
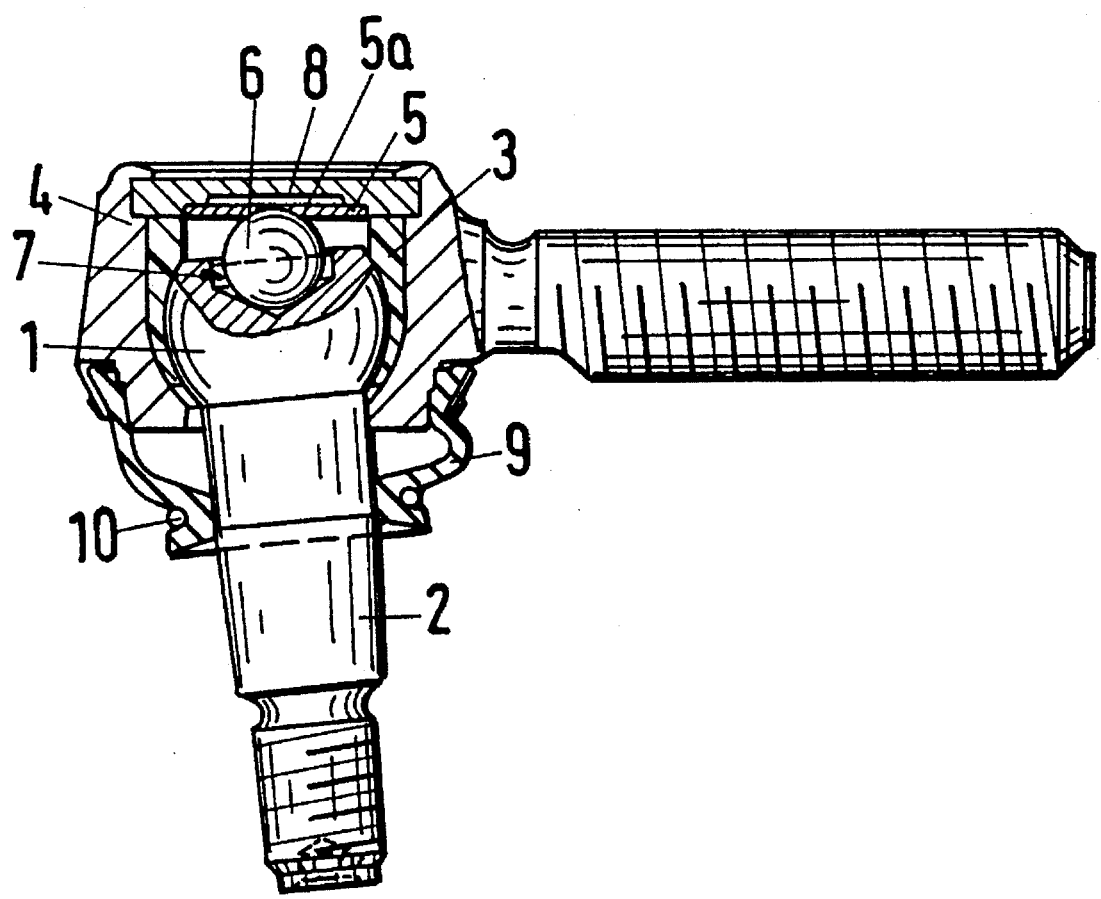

FIG. 3 a partial longitudinal section of an assembled pivot joint in a deflected state.

The pivot joint represented in FIG. 2 is composed essentially of a ball pivot (1), which is integral with pivot shank (2), whereby ball pivot (1) is mounted such that it is twistable and horizontally sweepable in a bearing shell (3) which is arranged in a housing (4).

The inner construction of the pivot joint as claimed in the invention is to be taken from the exploded view represented in FIG. 1. Bearing shell (3), configured as a bushing, is set into housing (4) from above through an installation opening (4a). Next, ball pivot (1), which is integral with pivot shank (2), is likewise set into housing (4) from above, whereby pivot shank (2) projects beyond housing (4) through an opening (4b). Ball pivot (1) is pressed into housing (4) or bearing shell (3) until bearing shell (3), formed of an elastic material, encloses a ball race-shaped bearing surface (1a) of the ball pivot.

In order to insure a return movement of the pivot joint to the home position when the pivot joint has been deflected, the pivot joint configured as claimed in the invention features a restoring arrangement effecting the greatest independence from tolerance and wear. This restoring arrangement is composed of a spring (5) and ball (6), which is mounted in a countersink (7) configured on the end surface (1b) of ball pivot (1) located opposite pivot shank (2). Spring (5), which sits on ball (6) is supported by a cover (8) on the opposite side which seals the installation opening (4a) of housing (4) of the finished assembled pivot joint. In order to seal the installation opening (4a), cover (8) is set into housing (4) and the rim of installation opening (4a) is flattened down over cover (8).

The restoring arrangement of the pivot joint as claimed in the invention functions as stated in the following:

Spring (5) which is configured as a disk spring is supported on its rim which fits in a recess (8a) of cover (8) and with its convex side sits closely next to ball (6) such that ball (6), which sits on conical surface (7a) of countersink (7), partially projects into a central hole (5a) of spring (5). When the pivot joint is deflected from its home position, ball (6) moves out in a curved path from central hole (5a) of spring (5), compressing spring (5) in an axial direction and placing it under tension. This deformation causes spring (5) to tend to return to its original shape. Accordingly, the spring force of spring (5) causes ball (6) and hence ball pivot (1) as well to return to the home position. A defined restoring force of spring (5) in the pivot Joint can be adjusted for by purposeful selection of both the form of the spring and the spring material.

In a finished assembled pivot joint, a sealing boot (9), fixed to pivot shank (2) by means of a tension ring (10), seals pivot shank (2) in the direction of housing (4) (as seen in FIG. 2). Sealing boot (9) prevents dirt and moisture from penetrating into the pivot joint.

List of reference characters (1) Ball pivot
(1a) Bearing surface
(1b) End surface
(2) Pivot shank
(3) Bearing shell
(4) Housing
(4a) Installation opening
(4b) Opening
(5) Spring
(5a) Central hole
(6) Ball
(7) Countersink
(7a) Conical surface
(8) Cover (8a) Recess
(9) Sealing boot
(10) Tension ring

I claim:

1. Pivot joint with a housing, in which a ball pivot is mounted via its ball race-shaped bearing surface by means of an inset bearing shell to be free from play with a delimited range and, set against a spring force, to be twistable and horizontally sweepable whereby said ball pivot is provided with an end surface located opposite a pivot shank, and a countersink, whereby a ball sits closely on the surface of said countersink extending to this end surface and the ball being acted upon on the force of a spring element supported by a cover which seals the housing, characterized in that the countersink (2) is configured conical and that said spring element is configured as a disk spring (5) which sits with its convex side closely adjacent to said ball (6) and is supported by its rim which fits in a recess (8a) in cover (8).

2. Pivot joint of claim 1, characterized in that the bearing shell (3) is of one-piece construction produced from a polyamide.

* * * * *